(12) United States Patent
Shiotsuki et al.

(10) Patent No.: US 7,441,690 B2
(45) Date of Patent: Oct. 28, 2008

(54) JOINED STRUCTURE OF DIFFERENT METALS AND FRICTION WELDING METHOD THEREOF

(75) Inventors: Katsuhiko Shiotsuki, Wako (JP); Masashi Fujita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 147 days.

(21) Appl. No.: 10/995,271

(22) Filed: Nov. 24, 2004

(65) Prior Publication Data

US 2005/0087583 A1  Apr. 28, 2005

Related U.S. Application Data

(62) Division of application No. 10/211,375, filed on Aug. 5, 2002, now Pat. No. 6,828,038.

(30) Foreign Application Priority Data

Aug. 6, 2001 (JP) .............................. 2001-237634

(51) Int. Cl.
*B23K 20/12* (2006.01)
(52) U.S. Cl. .................. 228/112.1; 228/233.1
(58) Field of Classification Search .............. 228/112.1, 228/114.5
See application file for complete search history.

(56) References Cited

U.S. PATENT DOCUMENTS

| | | | |
|---|---|---|---|
| 3,693,238 A * | 9/1972 | Hoch et al. ................ 228/113 |
| 3,728,781 A | 4/1973 | Curtis et al. | |
| 4,564,020 A | 1/1986 | Link | |
| 4,706,550 A | 11/1987 | Bullat | |
| 5,111,990 A | 5/1992 | Thrower et al. | |
| 5,271,287 A * | 12/1993 | Wadleigh ..................... 74/439 |
| 5,314,106 A | 5/1994 | Ambroziak et al. | |
| 5,469,617 A | 11/1995 | Thomas et al. | |
| 5,492,264 A | 2/1996 | Wadleigh | |
| 5,897,047 A | 4/1999 | Takei et al. | |
| 6,105,849 A * | 8/2000 | Mochizuki et al. ....... 228/112.1 |
| 6,364,779 B1 | 4/2002 | Duddy | |
| 6,637,642 B1 | 10/2003 | Lingnau | |
| 6,641,028 B2 * | 11/2003 | Shinoda et al. .......... 228/112.1 |
| 6,833,199 B2 * | 12/2004 | Fujita et al. ................. 428/615 |
| 2003/0031892 A1 | 2/2003 | Fujita et al. | |
| 2003/0102353 A1 | 6/2003 | Shiotsuki et al. | |

FOREIGN PATENT DOCUMENTS

| | | | |
|---|---|---|---|
| DE | 3802300 A | | 8/1989 |
| EP | 1222990 A1 | | 7/2002 |
| JP | 2-205279 | * | 2/1989 |
| JP | 2-30386 | * | 1/1990 |
| JP | 2-160188 | * | 6/1990 |
| JP | 4-0231183 | * | 8/1992 |

OTHER PUBLICATIONS

Katori, JP 4-0231183, Aug. 1992, English Translation.*
Ishikawa, JP 2-160188, Jun. 1990, English Translation.*
Kaname, JP 02-205279, Aug. 1990, English Abstract.*

* cited by examiner

*Primary Examiner*—Kiley Stoner
(74) *Attorney, Agent, or Firm*—Arent Fox LLP.

(57) ABSTRACT

A joined structure of different metals is usable even in a severely corrosive environments such locations susceptible to salt damage. In a joined structure of different metals, members of different metals are joined to each other in such a manner that a flange is allowed to extend in a direction from the circumferential side of one of the members along the circumference of the other member.

4 Claims, 4 Drawing Sheets

JOINED STRUCTURE OF DIFFERENT METALS AND FRICTION WELDING METHOD THEREOF

CROSS-REFERENCE TO RELATED APPLICATION

This is a Divisional of application Ser. No. 10/211,375 filed Aug. 5, 2002 now U.S. Pat. No. 6,828,038. The disclosure of the prior application is hereby incorporated by reference herein in its entirety.

BACKGROUND OF THE INVENTION

1. Field of the Invention

The present invention relates to a joined structure of different metals which has improved corrosion resistances at the joined interface. The present invention also relates to a friction welding method that is desirably used for manufacturing the above-mentioned joined structure of different metals.

2. Description of the Related Art

With respect to joints formed by joining members of different metals through a metallurgical method such as a friction welding method, conventionally, a joint which has a flange that is caused by a material melted or discharged during the joining process and bent toward the side of the base material of the flange with respect to the joined interface, or a joint on which the flange is ground to provide a smooth circumference of the joined interface, has been used.

However, the respective metals (pure metals or alloys) have natural electric potentials that are inherent to the components, and when different metals are placed very close to each other or in a joined state and an electrolytic solution is supplied between the different metals, a phenomenon similar to that in a battery takes place due to the difference between the natural electric potentials, causing corrosion to progress between the different metals. For this reason, in the case of the conventional joints in which the circumference of the joined interface is continually exposed to the external atmosphere, when the surface is not coated with paint, etc., or when the coated paint, etc., has separated therefrom, an electrolytic solution, which is a main source of corrosion, is easily supplied to the joined interface, resulting in failure to prevent the progress of corrosion.

SUMMARY OF THE INVENTION

The present invention has been devised so as to solve the above-mentioned problems, and objects thereof are to provide a joined structure of different metals which can improve the corrosion resistance at the joined interface by utilizing a flange that is generated during a joining process and which is usable even in severely corrosive environments such as the use in a location susceptible to salt damage.

The joined structure of different metals of the present invention, which is a joined structure formed by joining members of different metals, is characterized in that a flange is allowed to extend in a direction from the circumferential side of one of the members along the circumference of the other member. In the present invention, a flange refers to an area stretching outside from a line connecting the end portion of the original joining member at the time of joining is performed.

As shown in FIG. 1, in accordance with the joined structure of different metals of the present invention, a structure in which this flange 1 covers the circumferential portion of the joined interface forms is formed by allowing a flange 1 to extend in a direction from the circumferential side of one of members (first member) 2 along the circumference of the other member (second member) 3. In this structure, it is possible to prevent an electrolytic solution such as salt water from reaching the joined interface by the existence of the flange. Moreover, even in the case when the electrolytic solution enters the inside of the flange 1, the flange 1 or one portion of the second member 3 in the vicinity of the joined interface is subject to corrosion by this electrolytic solution to generate an oxide product 4, and this oxide product 4 accumulates in a gap between the flange 1 and the second member 3 so that a further supply of the electrolytic solution to the vicinity of the joined interface is blocked, thereby inhibiting corrosion at the joined interface. Therefore, the joined structure of different metals of the present invention has an effect for delaying the progression of corrosion at the joined interface as described above, thereby achieving improvement of corrosion resistances.

In another aspect of the joined structure of different metals of the present invention, by taking the natural electric potential difference between the different metals into consideration, the flange that is extended in a direction from the circumferential side of one of the members along the circumference of the other member is made of a metal that is relatively low in natural electric potential between the different metals. In other words, as shown in FIG. 2, in a joined structure having members of different metals being joined to each other, a flange 1, which is made of a metal member that is relatively low in natural electric potential, is formed so as to extend in a direction from the circumferential side of a metal member 5 having a lower natural electric potential along the circumference of a metal member 6 having a higher natural electric potential so that the metal member 5 having a lower natural electric potential is arranged so as to cover the circumferential portion of the joined interface.

In this aspect, when an electrolytic solution is supplied between the flange 1 made of a metal member having a lower natural electric potential and the metal member 6 having a higher natural electric potential, the area of the flange 1 is subjected to corrosion. The corrosion of this flange area serves as a sacrifice corrosion for the corrosion at the joined interface. In other words, the electrolytic solution that will cause corrosion at the joined interface actually uses for causing corrosion between the flange 1 and the metal member 6 having a higher natural electric potential so as to decrease in the corrosion at the joined interface. Therefore, in this more preferable embodiment of the joined structure of different metals of the present invention, in addition to the above-mentioned effect of the flange for preventing the electrolytic solution from reaching the joined interface and the effect of the oxide product for blocking corrosion, the sacrifice corrosion effect of the flange is exerted so that it becomes possible to further improve the corrosion resistance of the joined structure of different metals.

The joined structure of different metals having such a joined interface is formed by, for example, a friction welding process that is one type of solid-phase joining method. In the friction process, the surfaces of the joined members are mechanically cleaned, and in the succeeding upset process, a reaction product generated at the joined interface is externally discharged, and the press-welding process between the two joined members is completed. Here, the member, which has been discharged together with the reaction product, forms a flange.

The friction welding method of members of different metals of the present invention is characterized in that a friction pressure is not more than the proof stress of the member having a lower melting point at the frictional interface temperature, and an upset pressure is not less than the proof stress of the member having a lower melting point at normal temperature. With this friction welding method, in a joined structure having members of different metals joined to each other, it becomes possible to allow a flange to desirably extend in a direction from the circumferential side of one of the members along the circumference of the other member.

In the friction process in the friction welding method of the present invention, the friction pressure must be set to not more than the proof stress of the member having a lower melting point in the friction interface temperature in order to store heat in an axis portion without continuously discharging the flange. This friction pressure is determined by the composition of the member having a lower melting point, and more specifically, the proof stress in a joined structure between a steel product and an aluminum alloy at an interface temperature of 450° C. is set to be 17 MPa in the case of an aluminum alloy (JIS A5052-H34), and 22 MPa in the case of another aluminum alloy (JIS A5454). Moreover, in the upset process, it is necessary to set the upset pressure to be not less than the proof stress of the member having a lower melting point at normal temperature in order to bend the axis so as to allow the flange to cover the joined interface. In the same manner as the friction pressure, this upset pressure is also determined by the composition of the member having a lower melting point, and more specifically, the proof stress at a normal temperature of 25° C. in a joined structure between a steel product and an aluminum alloy is set to be 215 MPa in the case of an aluminum alloy (JIS A5052-H34), and 240 MPa in the case of another aluminum alloy (JIS A5454).

Moreover, in the friction welding method of the present invention, when a friction time in the friction process is insufficient, the joined face is not sufficiently cleaned, that is, stains and residual oxides are excessively left at the joined face, causing a failure in obtaining a better welding state in the subsequent upset process. In contrast, when the friction time is too long, although the joined face is sufficiently cleaned, the input quantity of heat to be supplied to the joining members becomes too great, resulting in an excessive growth of the reaction product layer in the upset process and the subsequent serious degradation in the joining strength. For this reason, in the present invention, it is preferable to set the friction time appropriately by taking the above-mentioned friction pressure and upset pressure into consideration. Moreover, with respect to the upset time, any period of time may be set as long as it provides a sufficient press-welding process of the joining members.

DETAILED DESCRIPTION OF THE INVENTION

Figure 1:
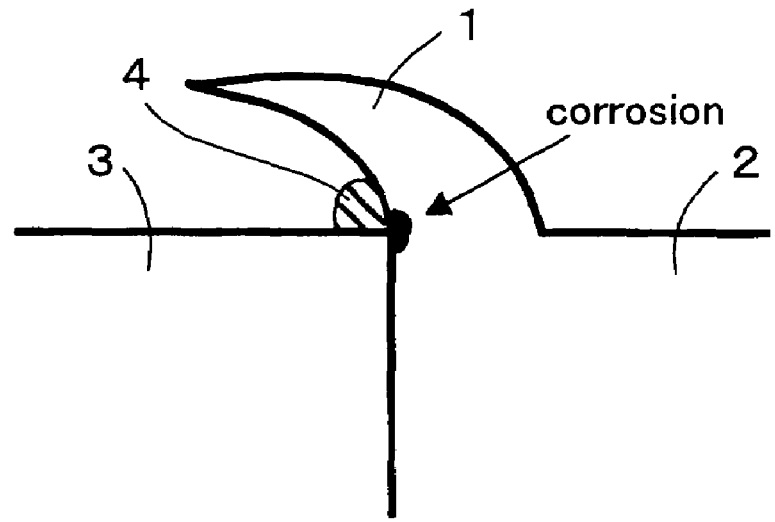
FIG. 1 is a cross-sectional view schematically showing a joined structure of different metals in accordance with one embodiment of the present invention.
Figure 2:
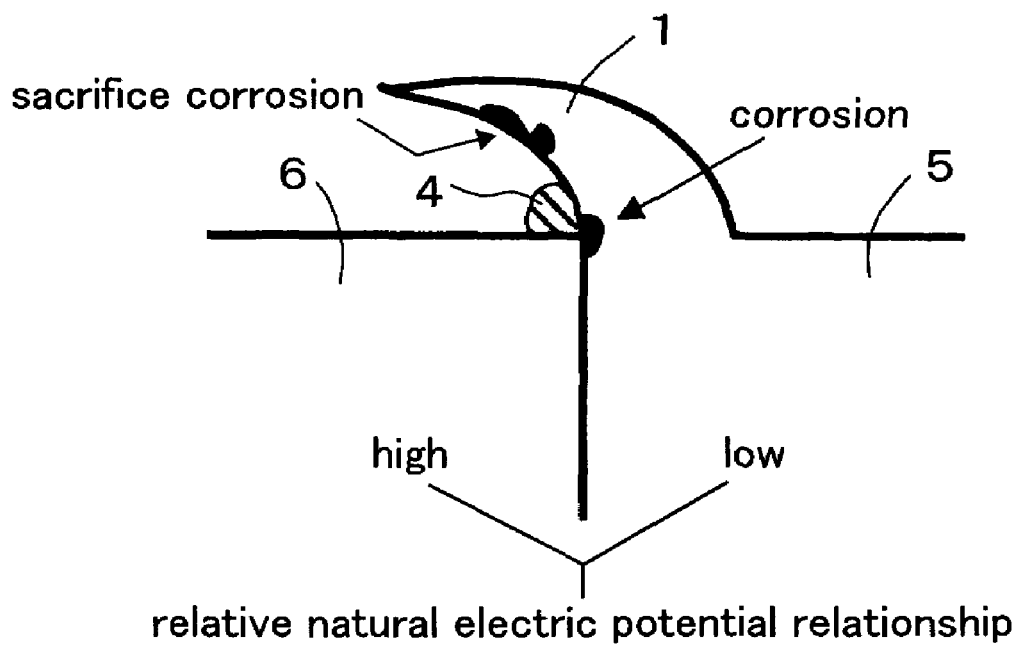
FIG. 2 is a cross-sectional view schematically showing a joined structure of different metals in accordance with another embodiment of the present invention.

In the following, the present invention will be explained in detail by referring to Examples.

EXAMPLE 1

A steel product (JIS S10C) was used as a metal member having a higher natural electric potential, and an aluminum alloy member (JIS A5052-H34) was used as a metal member having a lower natural electric potential, and these were formed into a cylindrical steel rod having an outer diameter of 16 mm and a predetermined length and a cylindrical aluminum alloy rod having an outer diameter of 16 mm and a predetermined length to prepare test pieces. The cylindrical steel rod was set to a fixed side and the cylindrical aluminum alloy rod was set to a rotating side. As shown in Table 1, after the faces to be joined of the two members had been defatted by using acetone, the cylindrical aluminum alloy rod was rotated at 1200 rpm and was made to frictionally weld with the cylindrical steel rod at a friction pressure of 10 MPa for a friction time of 3 seconds; thereafter, these were made to press-weld with each other with an upset pressure of 250 MPa for an upset time of 6 seconds to prepare a joined structure of the steel product and the aluminum alloy of Example 1. Here, the friction welding process of the cylindrical steel rod and the cylindrical aluminum alloy rod was carried out by a brake method that is a conventional method.

TABLE 1

| | Material | | Joining conditions | | | | |
| --- | --- | --- | --- | --- | --- | --- | --- |
| | Steel product | Aluminum alloy | Friction pressure P1 (MPa) | Number of revolutions N (rpm) | Friction time T1 (sec.) | Upset pressure P2 (MPa) | Upset time T2 (sec.) |
| Example 1 | S10C | A5052-H34 | 10 | 1200 | 3 | 250 | 6 |
| Comparative Example 1 | S10C | A5052-H34 | 10 | 1200 | 3 | 250 | 6 |
| Comparative Example 2 | S35C | A5454 | 62.5 | 1200 | 1 | 150 | 6 |

The thus-obtained joined structure of a steel product and an aluminum alloy of Example 1 was greatly deformed on the cylindrical aluminum alloy rod side having a lower strength in the cross-section of the joined portions, and the deformed portion was discharged to form a flange that extends in a direction from the circumferential side of the cylindrical aluminum alloy rod along the circumference of the cylindrical steel rod in a manner so as to cover the circumferential portion of the joined interface.

COMPARATIVE EXAMPLE 1

With respect to the joined structure of a steel product and an aluminum alloy of Example 1, the flange was cut, and the circumferential portion of the joined structure was ground to a smooth face, thereby obtaining a joined structure of a steel product and an aluminum alloy of Comparative Example 1.

COMPARATIVE EXAMPLE 2

A steel product (JIS S35C) was used as a metal member having a higher natural electric potential, and an aluminum alloy member (JIS A5454) was used as a metal member having a lower natural electric potential, and these were formed into a cylindrical steel rod having an outer diameter of 16 mm and a predetermined length and a cylindrical aluminum alloy rod having an outer diameter of 16 mm and a predetermined length to prepare test pieces. Next, the cylindrical steel rod was set to a fixed side and the cylindrical aluminum alloy rod was set to a rotating side. As shown in Table 1, after the joining faces of the two members had been defatted by using acetone, the cylindrical aluminum alloy rod was rotated at 1200 rpm and was made to frictionally weld with the cylindrical steel rod at a friction pressure of 62.5 MPa for a friction time of 1 second; thereafter, these were made to press-weld with each other with an upset pressure of 150 MPa for an upset time of 6 seconds to prepare a joined structure of the steel product and the aluminum alloy of Example 1. Here, the above-mentioned friction welding process was carried out in the same manner as in Example 1.

The thus-obtained joined structure of a steel product and an aluminum alloy of Comparative Example 2 was greatly deformed on the cylindrical aluminum alloy rod side having a lower strength in the cross-section of the joined portions, and the deformed portion was discharged to form a flange that was bent from the joined interface toward the cylindrical aluminum alloy rod side.

CORROSIVE ENVIRONMENT TEST

Corrosive environment tests including a cycle shown in Table 2 in which salt-water spraying, drying, and wet environments were combined with high and low temperatures were carried out on the joined structures of steel products and aluminum alloys of Example 1 and Comparative Examples 1 and 2, obtained as described above, and corrosion states in the vicinity of the joined interface were observed. The results of these tests show in FIGS. 3 to 5. Therein, figures labeled A are each a cross-sectional photograph showing the joined interface, and figures labeled B are each a cross-sectional drawing schematically showing figures labeled A.

TABLE 2

|  | Mode | Condition | Time (hr) |
| --- | --- | --- | --- |
| Step 1 | Wet | 40° C., 95% RH | 2 |
| Step 2 | Salt-water spray | 35° C., 5% NaCl | 2 |
| Step 3 | Dry | 60° C. | 1 |
| Step 4 | Wet | 50° C., 95% RH | 6 |

TABLE 2-continued

|  | Mode | Condition | Time (hr) |
| --- | --- | --- | --- |
| Step 5 | Dry | 60° C. | 2 |
| Step 6 | Wet | 50° C., 95% RH | 6 |
| Step 7 | Dry | 60° C. | 2 |
| Step 8 | Low temperature | −20° C. | 3 |

Figure 3A:
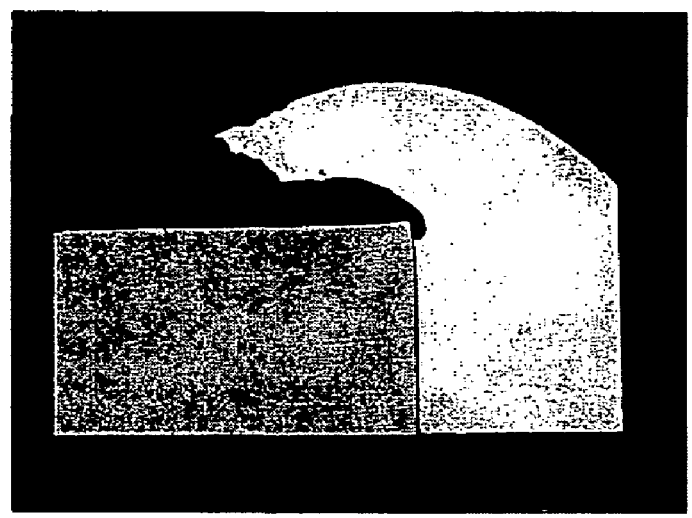
FIG. 3A is a cross-sectional photograph showing a joined structure of different metals in accordance with Example 1 of the present invention after a corrosive environment test.
Figure 3B:
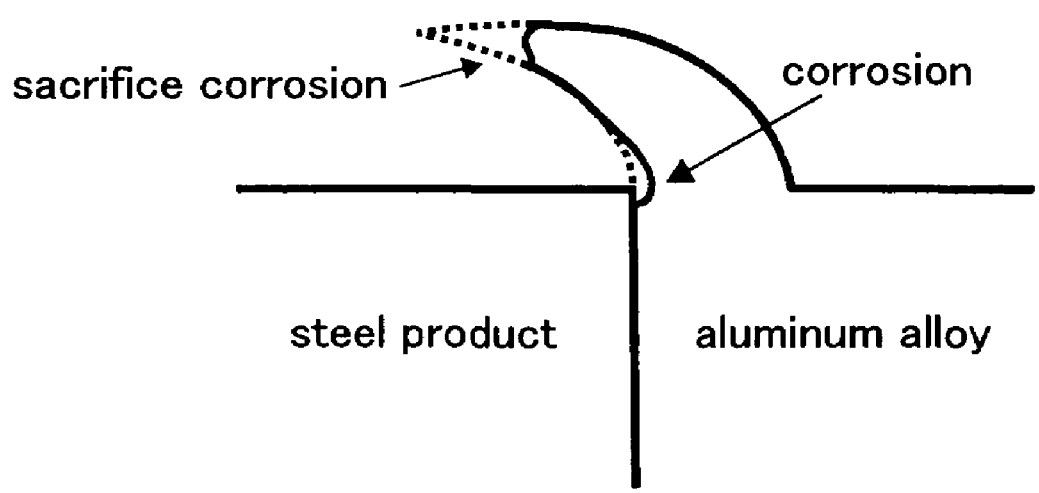
FIG. 3B is a cross-sectional view schematically showing FIG. 3A.
Figure 4A:
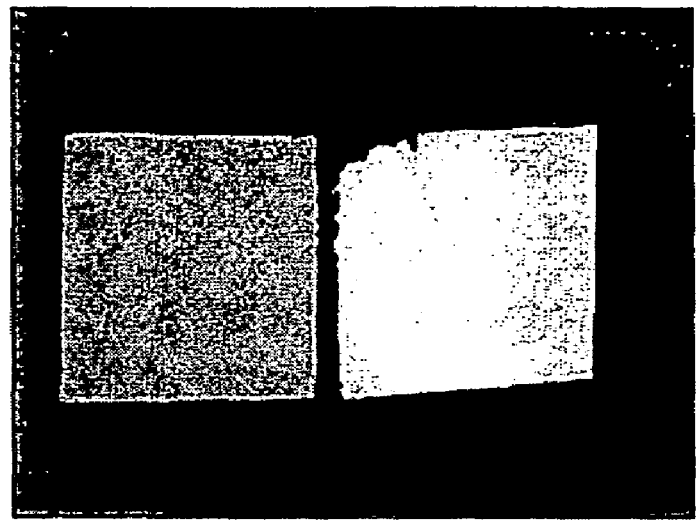
FIG. 4A is a cross-sectional photograph showing a joined structure of different metals in accordance with Comparative Example 1 after a corrosion environment test.
Figure 4B:
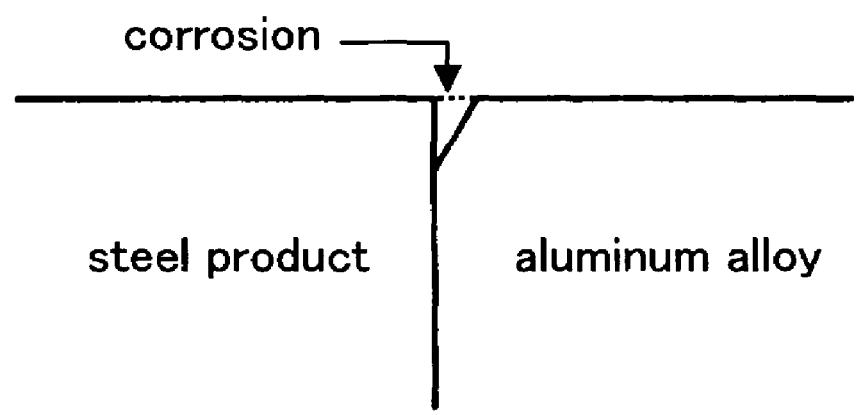
FIG. 4B is a cross-sectional view schematically showing FIG. 4A.
Figure 5A:
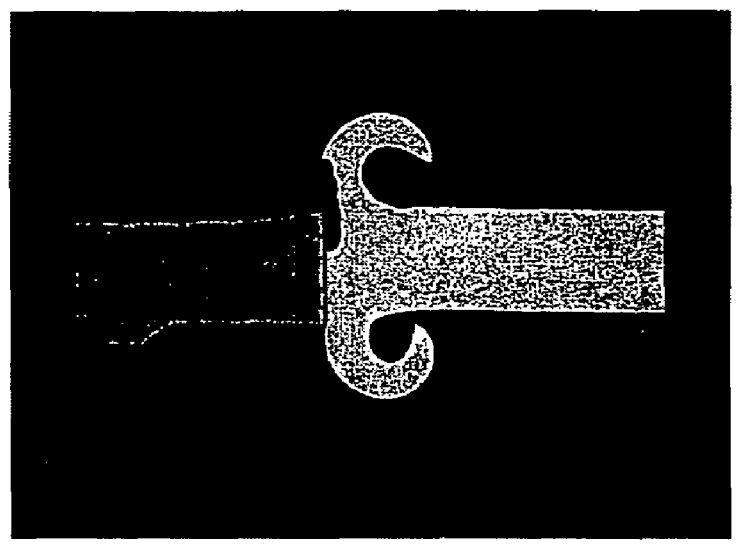
FIG. 5A is a cross-sectional photograph showing a joined structure of different metals in accordance with Comparative Example 2 after a corrosion environment test.
Figure 5B:
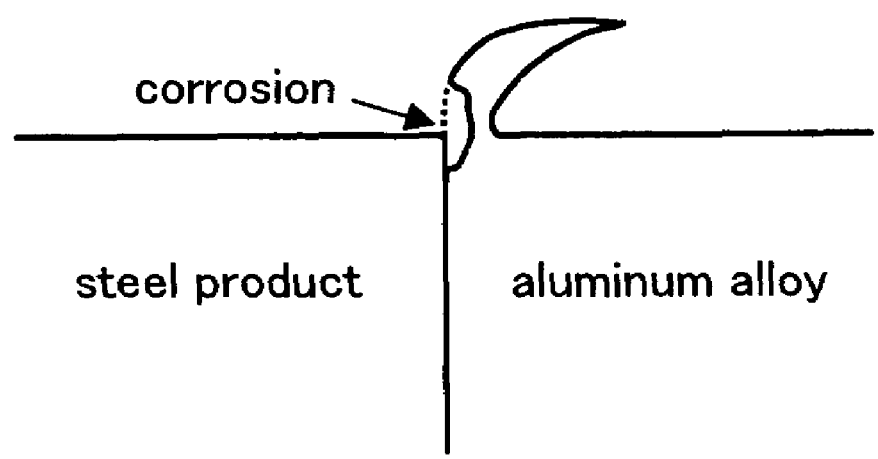
FIG. 5B is a cross-sectional view schematically showing FIG. 5A.

As a result of the above-mentioned corrosive environment tests, with respect to the joined structure of Example 1 in which a flange is allowed to extend in a direction from the circumferential side of the cylindrical aluminum alloy rod along the circumference of the cylindrical steel product rod in a manner so as to cover the circumferential portion of the joined interface, as shown in FIG. 3, even after tests of 90 cycles, there was only slight corrosion at the joined interface, although the top portion of the flange was subjected to sacrifice corrosion. In contrast, in the case of the joined structure of Comparative Example 1 in which the flange had been cut off and the circumference of the joined structure had been ground to form a smooth surface, as shown in FIG. 4, the corrosion progressed along the joined interface and it was damaged after tests of 40 cycles. Moreover, in the case of the joined structure of Comparative Example 2 in which the flange was bent from the joined interface toward the cylindrical aluminum alloy rod side, as shown in FIG. 5, although there was a delay in corrosion due to the sacrifice corrosion effect of the flange, it was not possible to block the supply of salt water, and after tests of 90 cycles, the corrosion at the joined interface progressed at the same speed as the corrosion of the flange, failing to provide sufficient corrosion resistances.

Therefore, with respect to the joined structure of a steel product and an aluminum alloy, by providing the arrangement in which a flange is allowed to extend in a direction from the circumferential side of a cylindrical aluminum alloy rod along the circumference of a cylindrical steel product rod in a manner so as to cover the circumferential portion of the joined interface, it becomes possible to suppress the progress of corrosion at the joined interface, and it is therefore possible to provide a joined structure between a steel product and an aluminum alloy which has improved corrosion resistances.

What is claimed is:

1. A friction welding method for members of different metals, the method comprising:

a friction welding step for contacting the members of different metals and relatively rotating the members while providing a friction pressure at a frictional interface of the members, the members consisting of a first member having a first melting point and a first proof stress, and a second member having a second melting point and a second proof stress, the first melting point being lower than the second melting point; and an upset step for upsetting the members at an upset pressure larger than the friction pressure;

wherein the friction pressure is set to be not more than the first proof stress of the first member at the frictional interface temperature, and the upset pressure is set to be not less than the first proof stress of the first member at a normal temperatures, wherein a flange extending from the first member to the second member is formed by the friction welding.

2. The friction welding method for members of different metals according to claim 1, wherein the different metals are a steel product and an aluminium alloy.

3. The friction welding method for members of different metals according to claim 1, wherein the flange is made of a metal having a natural electric potential which is lower than that of the metal of the other member.

4. The friction welding method for members of different metals according to claim 1, wherein the flange covers the circumference of the other member.

* * * * *